United States Patent [19]

Dennis et al.

[11] 4,153,932
[45] May 8, 1979

[54] DATA PROCESSING APPARATUS FOR HIGHLY PARALLEL EXECUTION OF STORED PROGRAMS

[75] Inventors: Jack B. Dennis, Belmont; David P. Misunas, Brighton, all of Mass.

[73] Assignee: Massachusetts Institute of Technology, Cambridge, Mass.

[21] Appl. No.: 605,932

[22] Filed: Aug. 19, 1975

Related U.S. Application Data

[63] Continuation-in-part of Ser. No. 456,488, Mar. 29, 1974, Pat. No. 3,962,706.

[51] Int. Cl.² ................... G06F 3/00; G06F 13/00; G06K 17/00
[52] U.S. Cl. .................. 364/200; 179/15 BA
[58] Field of Search ............ 445/1; 340/172.5; 179/15 AQ, 15 AT, 15 BA, 15 BV, 18 ES; 364/200 MS File, 900 MS File

[56] References Cited

U.S. PATENT DOCUMENTS

| | | | |
|---|---|---|---|
| 3,343,135 | 9/1967 | Freiman et al. | 340/172.5 |
| 3,349,375 | 10/1967 | Seeber et al. | 340/172.5 |
| 3,537,074 | 10/1970 | Stokes et al. | 340/172.5 |
| 3,594,730 | 6/1971 | Toy | 364/900 |
| 3,657,736 | 4/1972 | Boom et al. | 364/200 |
| 3,676,852 | 7/1972 | Abernathy et al. | 340/172.5 |
| 3,718,912 | 2/1973 | Hasbrouck et al. | 340/172.5 |
| 3,732,548 | 5/1973 | Howells et al. | 364/900 |
| 3,760,371 | 9/1973 | Pitroda et al. | 364/900 |
| 3,766,532 | 10/1973 | Liebel | 340/172.5 |
| 3,771,141 | 11/1973 | Culler | 364/200 |
| 3,878,514 | 4/1975 | Faber | 340/172.5 |
| 3,936,806 | 2/1976 | Batcher | 364/200 |
| 3,962,706 | 6/1976 | Dennis et al. | 364/900 |
| 3,970,993 | 7/1976 | Finnilla | 364/200 |
| 3,978,452 | 8/1976 | Barton et al. | 364/200 |
| 3,979,728 | 9/1976 | Reddaway | 364/200 |
| 3,979,733 | 9/1976 | Fraser | 364/900 |
| 3,984,819 | 10/1976 | Anderson | 364/200 |
| 3,988,545 | 10/1976 | Kuemmerle et al. | 364/200 |
| 4,025,771 | 5/1977 | Lynch et al. | 364/200 |
| 4,074,351 | 2/1978 | Boone et al. | 364/200 |
| 4,075,688 | 2/1978 | Lynch et al. | 364/200 |

Primary Examiner—Gareth D. Shaw
Assistant Examiner—Jan E. Rhoads
Attorney, Agent, or Firm—Arthur A. Smith, Jr.; Gerald Altman

[57] ABSTRACT

A processor is described which achieves highly parallel execution of programs represented in data-flow form. The language implemented incorporates conditional and iteration mechanisms, and the processor incorporates practical data-flow processing of a Fortran-level data-flow language. The processor has a unique architecture which avoids the problems of processor switching and memory/processor interconnection that usually limit the degree of realizable concurrent processing. The architecture offers an unusual solution to the problem of structuring and managing a two-level memory system.

17 Claims, 17 Drawing Figures

(a) data link    (b) control link (a) operator    (b) decider (c) T-gate    (d) F-gate (e) merge    (f) boolean operator (a) operators  (b) deciders  (c) Boolean operators and control distribution

|   |    |    |    |
|---|----|----|----|
| I | op | d1 |    |
| D | g1 | v1 |    |
| D | g2 | v2 |    |

|   |    |    |    |
|---|----|----|----|
| I | pr | t1 | d1 |
| D | g1 | v1 |    |
| D | g2 | v2 |    |

|   |    |    |    |    |
|---|----|----|----|----|
| I | bo | t1 | d1 |    |
| B | g1 | c1 | t2 | d2 |
| B | g2 | c2 | t3 | d3 |

|   |    |    |
|---|----|----|
| I | op | d1 |
| I |    | d2 |
| D | g1 | v1 |

|   |    |    |    |
|---|----|----|----|
| I | pr | t1 | d1 |
| I |    | t2 | d2 |
|   | g1 | v1 |    |

|   |    |    |    |
|---|----|----|----|
| I | bo | t1 | d1 |
| I |    | t2 | d2 |
| B | g1 | c1 | t3 | d3 | op  - operation code  
pr  - predicate code  } instruction codes  
bo  - Boolean operation code d1, d2, d3  destination addresses  
t1, t2, t3  result tags  
g1, g2      gating codes  
v1, v2      data receivers  
c1, c2      control receivers

FIG. 10

(a) data operand register (b) Boolean operand register

|  |   | cell 1 |  |
|----|---|--------|---|
| 00 | I | [ident (8,11,14)] | |
| 01 | I | | |
| 02 | D | no | x |

|  |   | cell 2 |  |
|----|---|--------|---|
| 03 | I | [ident (7,13,20)] | |
| 04 | I | | |
| 05 | D | no | y |

|  |   | cell 3 |  |
|----|---|--------|---|
| 06 | I | less gate (11,13,16,20,23) | |
| 07 | D | no | (-) |
| 08 | D | no | (-) |

|  |   | cell 4 |  |
|----|---|--------|---|
| 09 | I | [ident (8,11,14)] | |
| 10 | I | | |
| 11 | D | true | (-) |

|  |   | cell 5 |  |
|----|---|--------|---|
| 12 | I | plus | (7,13,20) |
| 13 | D | true | (-) |
| 14 | D | no | (-) |

|  |   | cell 6 |  |
|----|---|--------|---|
| 15 | I | plus | (16,23) |
| 16 | D | true | 0 |
| 17 | D | cons | 1 |

|  |   | cell 7 |  |
|----|---|--------|---|
| 18 | I | print | ( ) |
| 19 | D | cons | <format> |
| 20 | D | false | (-) |

|  |   | cell 8 |  |
|----|---|--------|---|
| 21 | I | print | ( ) |
| 22 | D | cons | <format> |
| 23 | D | false | (-) |

FIG. 13

DATA PROCESSING APPARATUS FOR HIGHLY PARALLEL EXECUTION OF STORED PROGRAMS

The Government has rights in this invention pursuant to Grant No. NSF-76-58-GI-34671 and Institutional Patent Agreement No. 0010 awarded by the National Science Foundation.

RELATED APPLICATIONS

The present application is a continuation-in-part of application Ser. No. 456,488, filed Mar. 29, 1974, now U.S. Pat. No. 3,962,706, issued June 8, 1976, in the names of the applicants herein for Data Processing Apparatus For Highly Parallel Execution Of Stored Programs.

BACKGROUND

Studies of concurrent operation within a computer system and of the representation of parallelism in a programming language have yielded a new form of program representation, known as data flow. A data-flow language is data-driven; that is, each instruction is enabled for execution just when each required operand has been supplied by the execution of a predecessor instruction. Data-flow representations for programs have been described by Karp and Miller [8], Rodriguez [11], Adams [1], Dennis and Fosseen [5], Bahrs [2], Kosinski [9, 10], and Dennis [4]. The use of such languages in a processor is disclosed in Dennis [3]. Details of the above designated references are given below.

List of References

1. Adams, D. A. *A Computation Model With Data Flow Sequencing*. Technical Report CS 117, Computer Science Department, School of Humanities and Sciences, Stanford University, Stanford, Calif., December 1968.

2. Bahrs, A. Operation patterns (An extensible model of an extensible language). *Symposium on Theoretical Programming*, Novosibirsk, USSR, August 1972 (preprint).

3. Dennis, J. B. Programming generality, parallelism and computer architecture. *Information Processing 68*, North-Holland Publishing Co., Amsterdam 1969, 484–492.

4. Dennis, J. B. First version of a data flow procedure language. *Symposium on Programming*, Institut de Programmation, University of Paris, Paris, France, April 1974, 241-271.

5. Dennis, J. B., and J. B. Fosseen. *Introduction to Data Flow Schemas*. November 1973 (submitted for publication).

6. Dennis, J. B., and D. P Misunas. A computer architecture for highly parallel signal processing. *Proceedings of the ACM 1974 National Conference*, ACM, New York, November 1974.

7. Dennis, J. B., and D. P. Misunas. *The Design of a Highly Parallel Computer for Signal Processing Applications*. Computation Structures Group Memo 101, Project MAC, M.I.T., Cambridge, Mass., July 1974.

8. Karp, R. M., and R. E. Miller. Properties of a model for parallel computations: determinacy, termination, queueing. *SIAM J. Appl. Math.* 14 (November 1966), 1390-1411.

9. Kosinski, P. R. *A Data Flow Programming Language*. Report RC 4264, IBM T. J. Watson Research Center, Yorktown Heights, N.Y., March 1973.

10. Kosinski, P. R. A data flow language for operating systems programming. *Proceedings of ACM SIGPLAN-SIGOPS Interface Meeting, SIGPLAN Notices* 8, 9 (September 1973), 89–94.

11. Rodriguez, J. E. *A Graph Model for Parallel Computation*. Report TR-64, Project MAC, M.I.T., Cambridge, Mass., September 1969.

The disclosures of the foregoing references are incorporated into the present specification by reference. The disclosure of related application Ser. No. 456,488 is incorporated into the present specification by reference.

SUMMARY

We have developed an attractive architecture for a processor that executes elementary data-flow programs [6, 7]. The class of programs implemented by this processor corresponds to the model of Karp and Miller [8]. These data-flow programs are well suited to representing signal processing computations such as waveform generation, modulation and filtering, in which a group of operations is to be performed once for each sample (in time) of the signals being processed. This elementary data-flow processor avoids the problems of processor switching and processor/memory interconnection present in attempts to adapt conventional Von Neuman type machines for parallel computation. Sections of the machine communicate by the transmission of fixed size information packets, and the machine is organized so that the sections can tolerate delays in packet transmission without compromising effective utilization of the hardware.

It is desired to expand the capabilities of the data-flow architecture in order to provide a general purpose processor using a generalized data-flow language such as described by Dennis [4], Kosinski [9, 10] and Bahrs [2]. The present disclosure describes the development of a basic data-flow processor, designed to execute programs in a more powerful language than heretofore. The language of the basic machine is that described by Dennis and Fosseen [5], containing conditional and iterative expressions.

Presented herein is a solution to the major problems faced in the development of the basic machine. A straightforward solution to the incorporation of decision capabilities in the machine is described. In addition, the growth in program size and complexity with the addition of the decision capability necessitates the utilization of a two-level memory system. A design is presented in which only active instructions are in the operational memory of the processor, and each instruction is brought to that memory only when necessary for program execution, and remains there only as long as it is being utilized.

Generally, the illustrated embodiment features an active memory for holding at least a record of active instructions, an instruction memory for holding at least a record of a program, at least an operation unit for managing signals in correspondence with computations, at least a decision unit for managing signals in correspondence with selections, a first arbitration network for transmitting signals representing information packets from the active memory to the operation and decision units, a control network for tansmitting signals representing information packets from the decision unit to the active memory, a first distribution network for transmitting signals representing information packets from the operation unit to the active memory, a memory command network for transmitting signals representing information packets from the active memory to the instruction memory, a second arbitration network for transmitting signals representing information packets from the active memory to the instruction memory, and a second distribution network for transmitting signals representing information packets from the instruction memory to the active memory. In a modification of the foregoing association of components, the instruction memory, memory command network, second arbitration network and second distribution network are omitted in order to provide a machine of the same computational capability but with a less sophisticated memory capability.

The invention accordingly comprises the system, its components and their interrelationships, of the present disclosure, the scope of which will be indicated in the appended claims.

BRIEF DESCRIPTION OF THE DRAWINGS

For a fuller understanding to the nature and objects of the present invention, reference is to be made to the following description, which is to be taken in connection with the accompanying drawings, wherein:

FIG. 2b is a general schematic of a system for executing the data-flow program of FIG. 2a;

FIG. 10 illustrates certain instruction cell formats pertaining to the instruction cells of FIG. 3;

FIG. 13 illustrates the format of the instruction cells, when containing the program of FIG. 8.

DETAILED DESCRIPTION

Overview of the Preferred Embodiment

Figure 1:
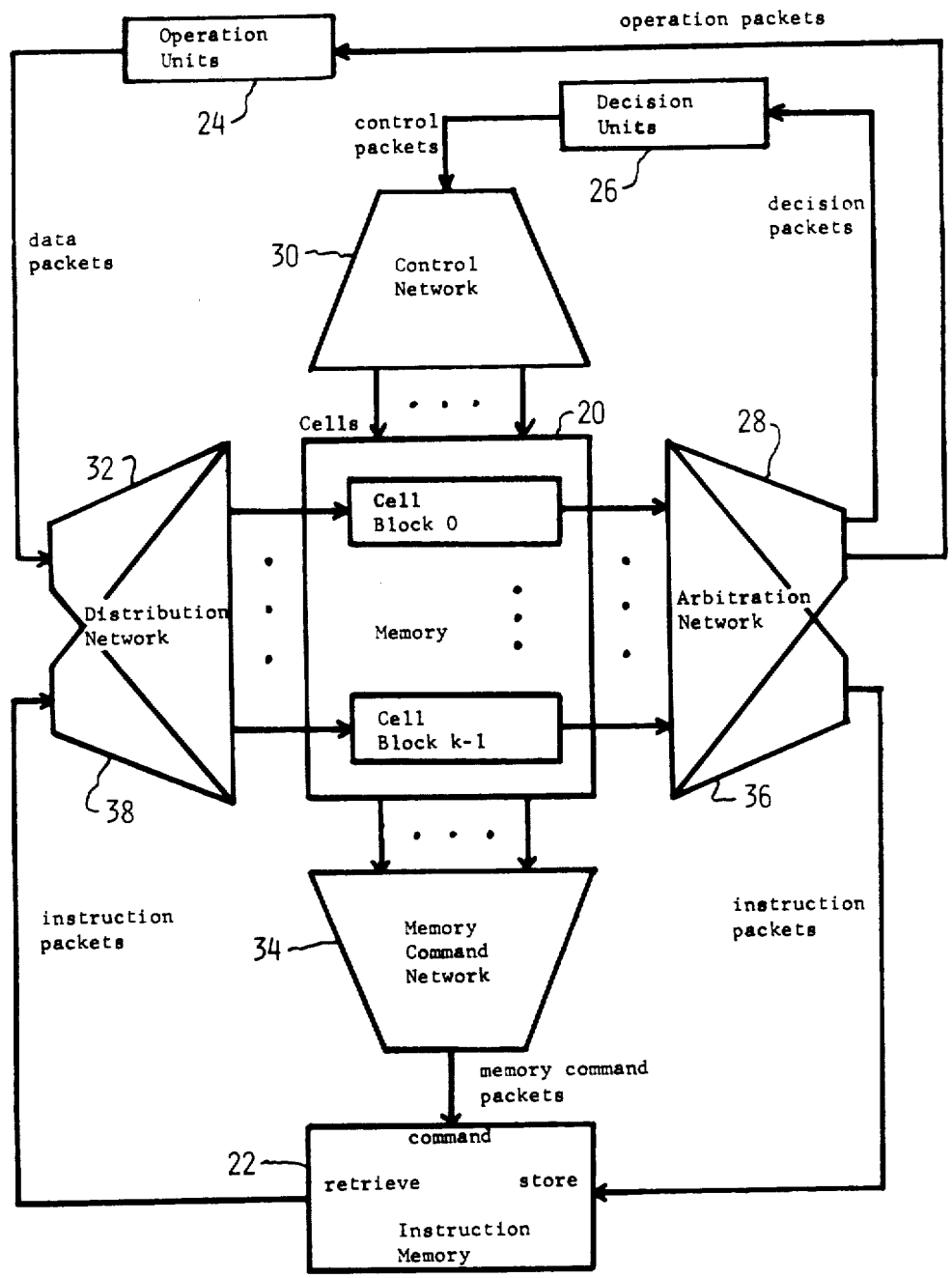
FIG. 1 is a general schematic of a system embodying the present invention.

Generally, the embodiment of FIG. 1 comprises an active memory 20 for holding at least a record of active instructions, an instruction memory 22 for holding at least a record of a program, one or more operation units 24 for managing signals in correspondence with computations, one or more decision units 26 for managing signals in correspondence with selections, a first arbitration network 28 for transmitting signals representing information packets from active memory 20 to operation units 24 and decision units 26, a control network 30 for transmitting signals representing information packets from the decision unit to active memory 20, a first distribution network 32 for transmitting signals representing information packets from operation units 24 to active memory 20, a memory command network 34 for transmitting signals representing information packets from active memory 20 to instruction memory 22, a second arbitration network 36 for transmitting signals representing information packets from active memory 20 to instruction memory 22, and a second distribution network for transmitting signals representing information packets from instruction memory 22 to active memory 20.

Figure 4:
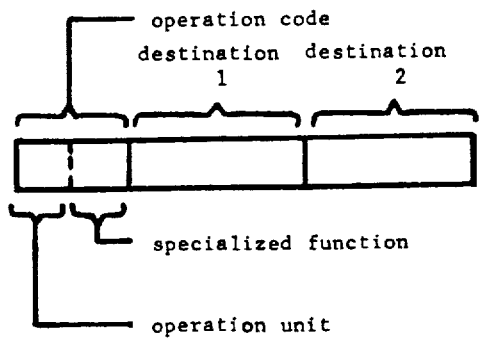
FIG. 4 is a detailed schematic of an instruction format, which describes an aspect of the instruction cell of FIG. 3.

Structural details of active memory 20 and instruction memory 22 are shown in the accompanying drawings and are described below and further structural details thereof are shown and described in aforementioned U.S. Pat. No. 3,962,706, in FIG. 4 and at column 4, lines 12-39. Structural details of operation units 24 and decision units 26 are shown in the accompanying drawings and are described below and further structural details thereof are shown and described in aforementioned U.S. Pat. No. 3,962,706, in FIG. 2 at #3 and at column 4, line 40 to column 5, line 24. Structural details of arbitration networks 28, 36 are shown in the accompanying drawings and are described below and further structural details thereof are shown and described in aforementioned U.S. Pat. No. 3,962,706, in FIGS. 35, 36 and at column 14, line 47 to column 15, line 45. Structural details of distribution networks 32, 38 are shown in the accompanying drawings and are described below and further structural details thereof are shown and described in aforementioned U.S. Pat. No. 3,962,706, in FIGS. 39, 40, 41, and at column 16, lines 14-53. Structural details of control network 30 are shown in the accompanying drawings and described below and are substantially the same as details of the distribution network of aforementioned U.S. Pat. No. 3,962,706 as shown in FIGS. 39, 40 and described at column 16, lines 13-53. Structural details of memory command network 34 are shown in the accompanying drawings and described below and are substantially the same as details of the arbitration network of aforementioned U.S. Pat. No. 3,962,706 as shown in FIGS. 35, 36 and described at column 15, line 20 to column 16, line 12.

Details of the components of the foregoing system are described below following a discussion of background considerations in reference to what is termed herein The Elementary Processor.

The Elementary Processor

The Elementary Processor is designed to utilize the elementary data-flow language as its base language. A program in the elementary data-flow language is a directed graph in which the nodes are operators or links. These nodes are connected by arcs along which values (represented as tokens) may travel. An operator of the schema is enabled when tokens are present on all input arcs. The enabled operator may fire at any time, removing the tokens on its input arcs, computing a value from the operands associated with the input tokens, and associating that value with a result token placed on its output arc. A result may be sent to more than one destination by means of a link which removes a token on its input and places identical tokens on its output(s). An operator or a link cannot fire unless there is no token present on any output arc of that operator or link.

Figure 2A:
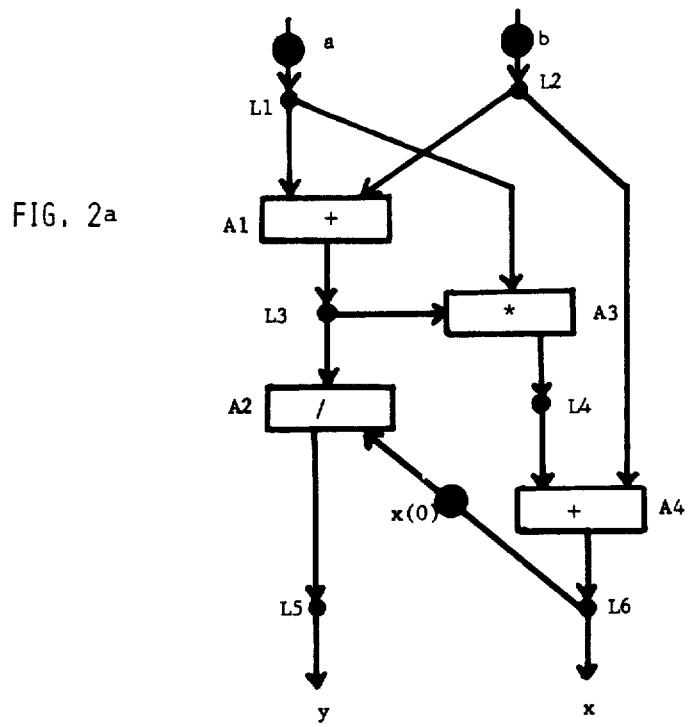
FIG. 2a is a diagram of an elementary data-flow program, illustrating certain background principles underlying the present invention.
Figure 2B:
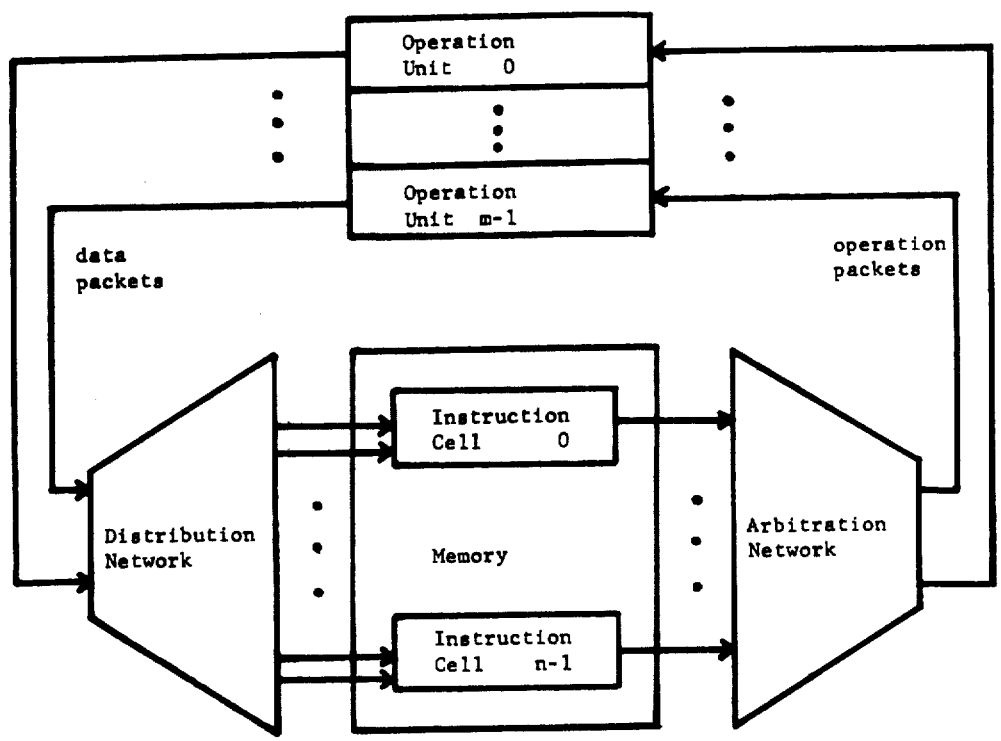

An example of a program in the elementary data-flow language is shown in FIG. 2a and represents the following simple computation:

input a, b $$y := (a+b)/x$$

$$x := (a*(a+b))+b$$

output y, x

The rectangular boxes in FIG. 2a are operators, and each arithmetic operator in the above computation is reflected in a corresponding operator in the program. The small dots are links. The large dots represent tokens conveying values for the initial configuration of the program.

In the program of FIG. 2a links L1 and L2 are initially enabled. The firing of L1 makes copies of the value a available to operators A1 and A3; firing L2 presents the value b to operators A1 and A4. Once L1 and L2 have fired (in any order), operator A1 is enabled since it will have a token on each of its input arcs. After A1 has fired (completing the computation of a+b), link L3 will become enabled. The firing of L3 will enable the concurrent firing of operators A2 and A3, and so on.

The computations represented by an elementary program are done in a data-driven manner; the enabling of an operator is determined only by the arrival of values on all input links, and no separate control signals are utilized. Such a scheme prompted the design of a processor arranged as in FIG. 2b.

Figure 3:
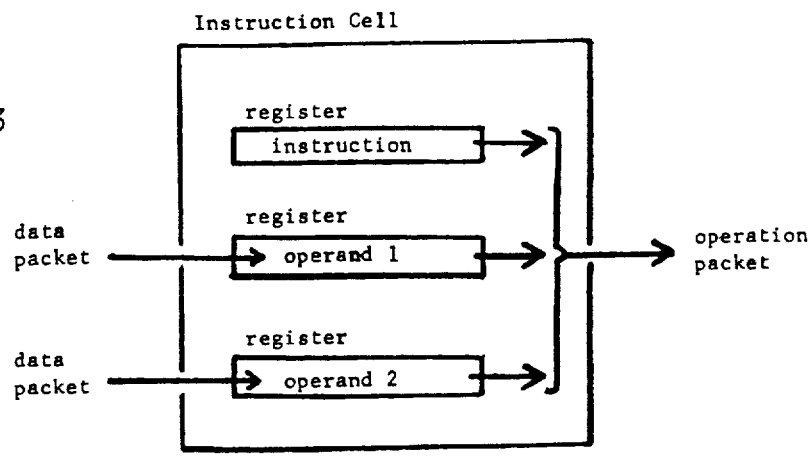
FIG. 3 is a detailed schematic of an instruction cell, which constitutes a component of the systems of FIGS. 1 and 2b.

A data-flow schema to be executed is stored in the Memory of the processor. The Memory is organized into Instruction Cells, each Cell corresponding to an operator of the data-flow program. Each Instruction Cell (FIG. 3) is composed of three registers. The first register holds an instruction (FIG. 4) which specifies the operation to be performed and the address(es) of the register(s) to which the result of the operation is to be directed. The second and third registers hold the operands for use in execution of the instruction.

When a Cell contains an instruction and the necessary operands, it is enabled and signals the Arbitration Network that it is ready to transmit its contents as an operation packet to an Operation Unit which can perform the desired function. The operation packet flows through the Arbitration Network which directs it to an appropriate Operation Unit by decoding the instruction portion of the packet.

The result of an operation exits an Operation Unit as one or more data packets, consisting of the computed value and the address of a register in the Memory to which the value is to be delivered. The Distribution Network accepts data packets from the Operation Units and utilizes the address of each to direct the data item through the network to the correct register in the Memory. The Instruction Cell containing that register may then be enabled if an instruction and all operands are present in the Cell.

Figure 5A:
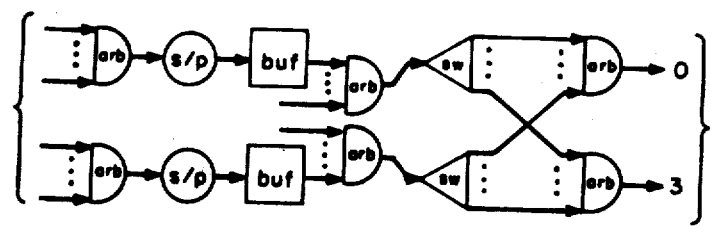
FIG. 5a is a detailed schematic of another component of the systems of FIGS. 1 and 2b.

Many Instruction Cells may be enabled simultaneously, and it is the task of the Arbitration Network to efficiently deliver operation packets to Operation Units and to queue operation packets waiting for each Operation Unit. The structure of the Arbitration Network, containing a unique path for operation packets from each Instruction Cell to each Operation Unit, is presented in FIG. 5a. Each Arbitration Unit passes packets arriving at its input ports one-at-a-time to its output port, using a round-robin discipline to resolve any ambiguity about which packet should be sent next. A Switch Unit assigns a packet at its input to one of its output ports, according to some property of the packet, in this case the operation code.

Figure 5B:
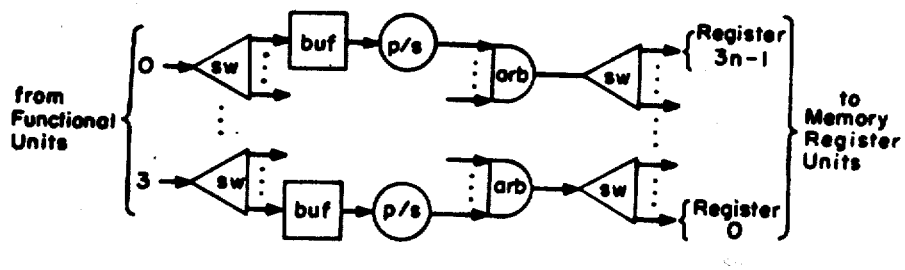
FIG. 5b is a detailed schematic of another component of the systems of FIGS. 1 and 2b.

The Distribution Network shown in FIG. 5b is similarly organized of Switch Units to route data packets from the Operation Units to the Memory Registers specified by the destination addresses. A few Arbitration Units are required so that data packets from different Operation Units can enter the network simultaneously.

Since the Arbitration Network has many input ports and only four output ports, the rate of packet flow will be much greater at the output ports. Thus, a serial representation of packets is appropriate at the input ports to minimize the number of connections to the Memory, but a more parallel representation is required at the output ports so a high throughput may be achieved. Hence, serial-to-parallel conversion is performed by conversion units within the Arbitration Network. Similarly, parallel-to-serial conversion of the value portion of each result packet occurs within the Distribution Network.

The Operation Units of the processor are pipelined in order to allow maximum throughput. The destination address(es) of an instruction are entered into identity pipelines of the Operation Unit and are utilized to form data packets with the result when it appears.

The Basic Data-Flow Language

Figure 6:
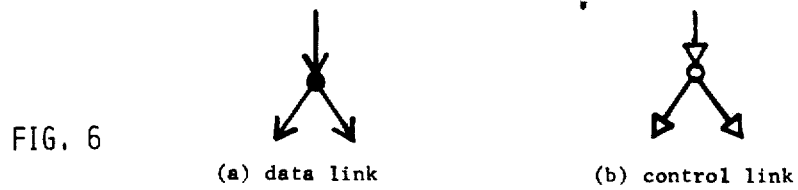
FIG. 6 illustrates symbols representing links of the basic data-flow language of the present invention.
Figure 7:
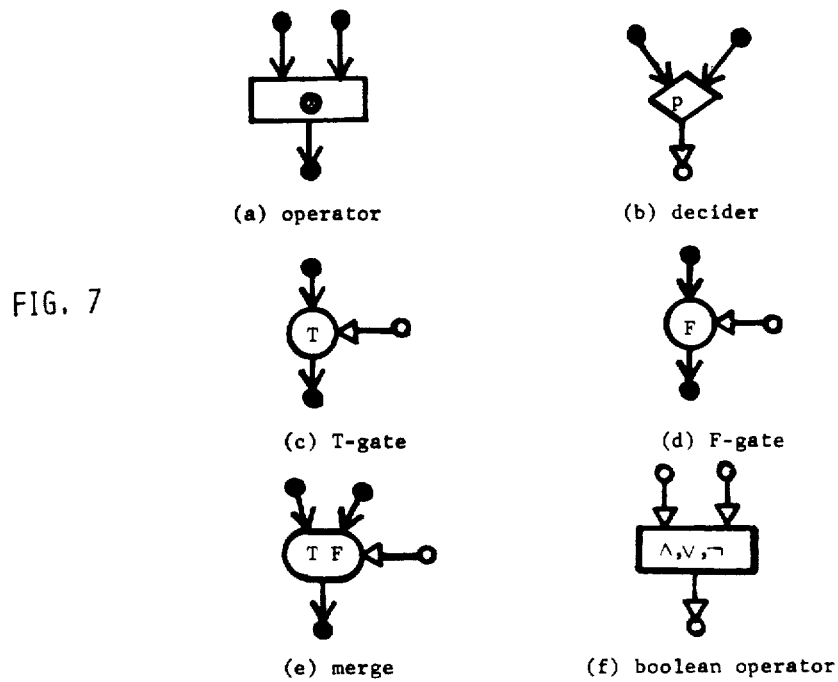
FIG. 7 illustrates symbols representing actors of the basic data-flow language of the present invention.

The representation of conditionals and iteration in data-flow form requires additional types of links and actors. The types of links and actors for the basic data-flow language are shown in FIGS. 6 and 7.

Data values pass through data links in the manner presented previously. The tokens transmitted by control links are known as control tokens and carry a value of either true or false. A control token is generated at a decider which, when the decider receives values from its input links, applies its associated predicate, and produces either a true or false control token at its output arc.

The control token produced at a decider can be combined with other control tokens by means of a Boolean operator (FIG. 7f), allowing a decision to be broken down into several smaller decisions.

Control tokens enable the flow of data tokens by means of either a T-gate, F-gate, or a merge (FIGS. 7c, d, e). A T-gate will pass the data token on its input arc to its output arc when it receives a control token conveying the value true at its control input. It will absorb the data token on its input arc and place nothing on its output arc if a false-valued control token is received.

Similarly, the F-gate will pass its input data token to its output arc only on receipt of a false-valued token on the control input. Upon receipt of a true-valued token, it will absorb the data token.

A merge actor has a true input, a false input, and a control input. It passes to its output arc a data token from the input arc corresponding to the value of the control token received. Any tokens on the other input are not affected.

As with the elementary schemas, a link or actor is not enabled to fire unless there is no token on any of its output arcs.

Figure 8:
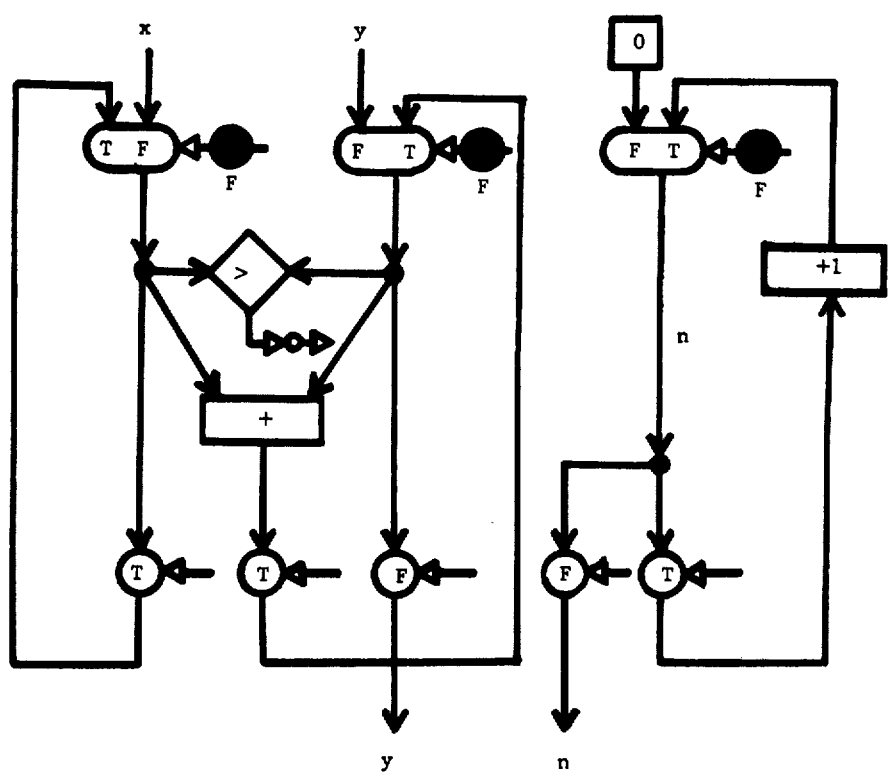
FIG. 8 is a basic data-flow program incorporating the components of FIGS. 6 and 7 in accordance with the present invention.

Using the actors and links of the basic data-flow language, conditionals and iteration can be easily represented. In illustration, FIG. 8 gives a basic data-flow program for the following computation:

input y, x $n := 0$ while $y < x$ do $y := y + x$ $n := n + 1$ end output y, n

The control input arcs of the three merge actors carry false-valued tokens in the initial configuration so the input values of x and y and the constant 0 are admitted as initial values for the iteration. Once these values have been received, the predicate $y < x$ is tested. If it is true, the value of x and the new value for y are cycled back into the body of the iteration through the T-gates and two merge nodes. Concurrently, the remaining T-gate and merge node return an incremented value of the iteration count n. When the output of the decider is false, the current values of y and n are delivered through the two F-gates, and the initial configuration is restored.

The Basic Data-Flow Processor

In contrast to elementary data-flow programs, the nodes of a basic data-flow program do not fire equally often during execution. As computation proceeds, different parts of the program become active or quiescent as iterations are initiated and completed, and as decisions lead to selection of alternate parts of a program for activation. Thus it would be wasteful to assign a Cell to each instruction for the duration of its execution. The basic data-flow processor must have a multi-level memory system such that only the active instructions of a program occupy the Cells of the processor. In the following sections we first show how decision capability is realized by augmenting the elementary processor; then we show how an auxiliary memory system is added so the Cells act as a cache for the most active instructions.

Decision Capability

Figure 9:
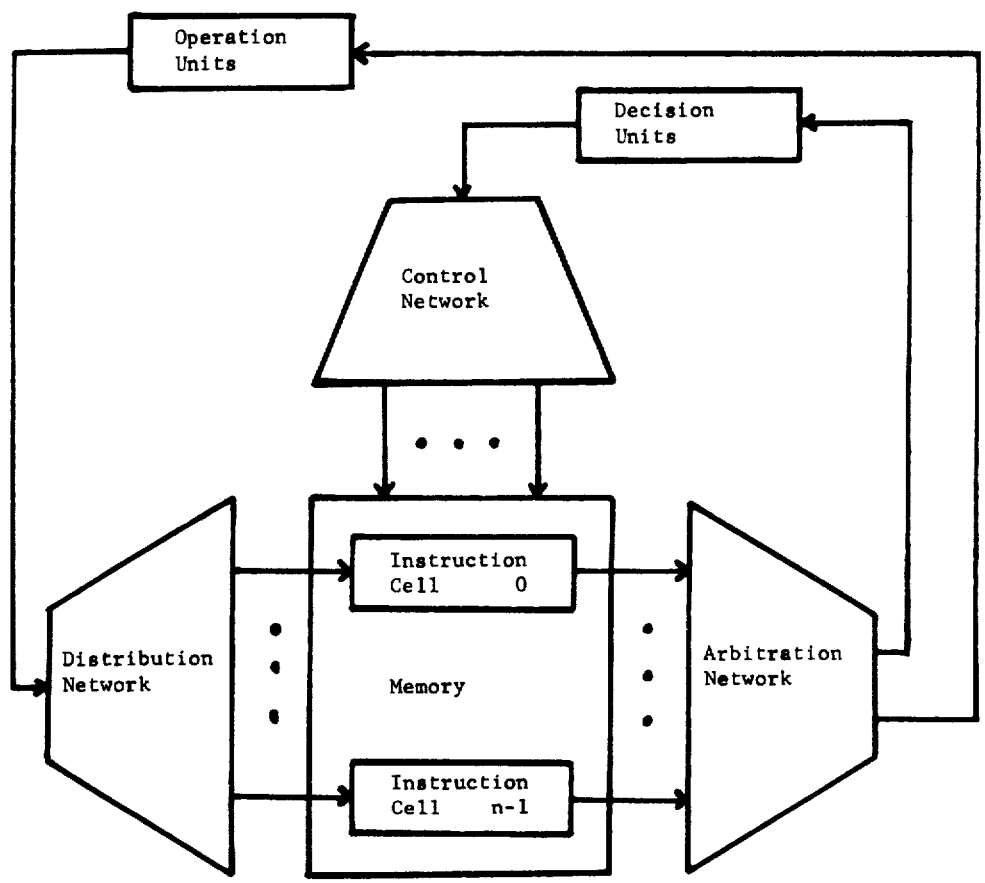
FIG. 9 is a general schematic of a simplified system incorporating certain components of the system of FIG. 1 and omitting other components thereof.

The organization of a basic data-flow processor without two-level memory is shown in FIG. 9. As in the elementary processor, each Instruction Cell consists of three Registers and holds one instruction together with spaces for receiving its operands. Each instruction corresponds to an operator, a decider, or a Boolean operator of a basic data-flow program. The gate and merge actors of the data-flow program are not represented by separate instructions; rather, the function of the gates is incorporated into the instructions associated with operators and deciders in a manner that will be described shortly, and the function of the merge actors is implemented for free by the nature of the Distribution Network.

Instructions that represent operators are interpreted by the Operation Units to yield data packets as in the elementary processor. Instructions that represent deciders or Boolean operators are interrupted by the Decision Units to yield control packets having one of the two forms $$\left\{ \text{gate,} \quad \left\{ \begin{array}{c} \text{true} \\ \text{false} \end{array} \right\}, \quad \text{(address)} \right\}$$

$$\left\{ \text{value,} \quad \left\{ \begin{array}{c} \text{true} \\ \text{false} \end{array} \right\}, \quad \text{(address)} \right\}$$

A gate-type control packet performs a gating function at the addressed operand register. A value-type control packet provides a Boolean operand value to an Instruction Cell that represents a Boolean operator.

The six formats for the contents of Instruction Cells in the basic processor are given in FIG. 10. The use of each Register is specified in its leftmost field:

I: instruction register
D: operand register for data values
B: operand register for Boolean values Only Registers specified to be operand registers of consistent type may be addressed by instructions of a valid program.

The remaining fields in the Instruction Cell formats are: an instruction code, op, pr or bo, that identifies the class and variation of the instruction in the Cell; from one to three destination addresses d1, d2, d3 that specify target operand registers for the packets generated by instruction execution; in the case of deciders and Boolean operators, a result tag t1, t2, t3 for each destination that specifies whether the control packet is of gate-type (tag=gate) or of value type (tag=value); and, for each operand register, a gating code g1, g2 and either a data receiver v1, v2 or a control receiver c1, c2.

The gating codes permit representation of gate actors that control the reception of operand values by the operator or decider represented by the Instruction Cell. The meanings of the code values are as follows:

| code value | meaning |
|---|---|
| no | the associated operand is not gated. |
| true | an operand value is accepted by arrival of a true gate packet; discarded by arrival of a false gate packet |
| false | an operand value is accepted by arrival of a false gate packet; discarded by arrival of a true gate packet. |
| const | the operand is a constant value |

Figure 11:
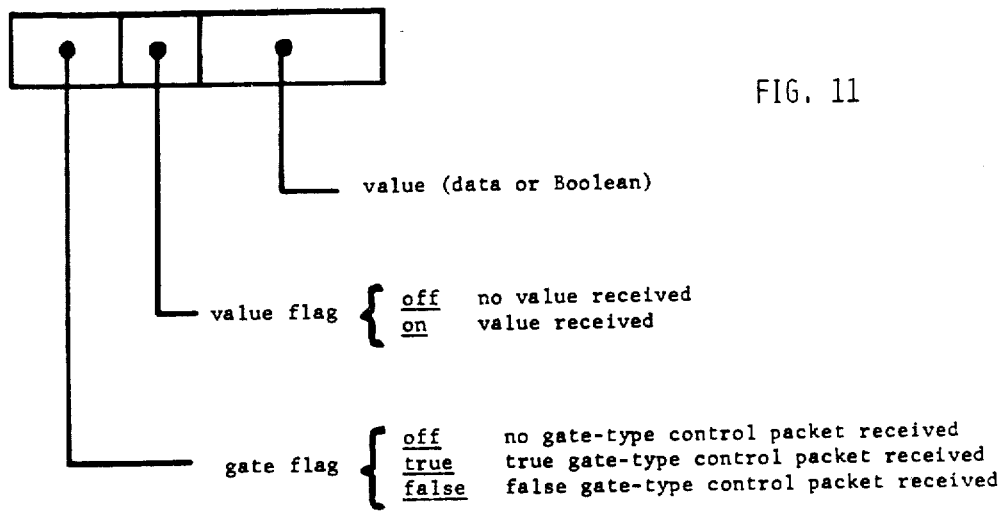
FIG. 11 illustrates a detail of an instruction cell format of FIG. 10.

The structure of a data or control receiver (FIG. 11) provides space to receive a data or Boolean value, and two flag fields in which the arrival of data and control packets is recorded. The gate flag is changed from off to true or false by a true or false gate-type control packet; the value flag is changed from off to on by a data packet or value type control packet according to the type of receiver.

Instruction Cell Operation

The function of each Instruction Cell is to receive data and control packets, and, when the Cell becomes enabled, to transmit an operation or decision packet through the Arbitration Network and reset the Instruction Cell to its initial status. An Instruction Cell becomes enabled just when all three of its registers are enabled. A register specified to act as an instruction register is always enabled. Registers specified to act as operand registers change state with the arrival of packets directed to them. The stage transitions and enabling rules for operand registers are defined in FIG. 12a.

Figure 12A:
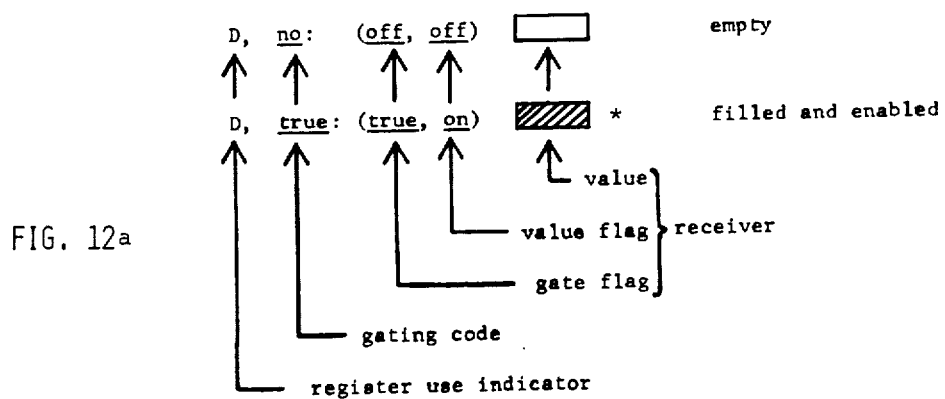
FIG. 12a illustrates the format of certain state transition and enabling rules used in FIG. 12b.
Figure 12B:
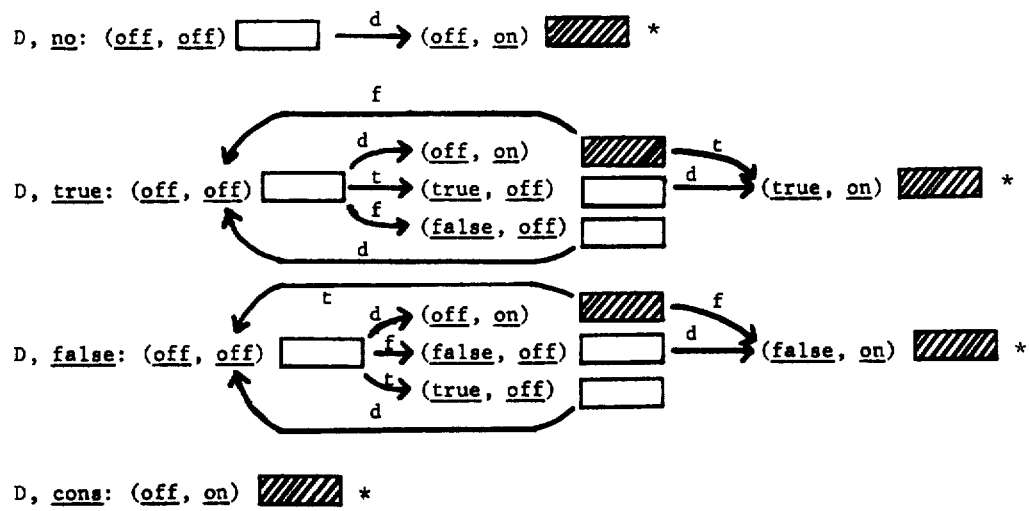
FIG. 12b illustrates the state and enabling rules of a component of the instruction cell of FIG. 3.

In FIG. 12b the contents of an operand register are represented as in FIG. 12a. The asterisk indicates that the Register is enabled. Events denoting arrival of data and control packets are labelled thus:
- d: data packet
- t: true gate-type control packet
- f: false gate-type control packet
- c: value-type control packet With this explanation of notation, the state changes and enabling rules in FIG. 12b are applied. Note that arrival of a gate-type control packet that does not match the gating code of the Register causes the associated data packet to be discarded, and resets the register to its starting condition.

The operation packets sent to Operation Units and decision packets sent to Decision Units consist of the entire contents of the Instruction Cell except for the gating codes and receiver status fields. Thus the packets sent through the Arbitration Network have the following formats:

To the Operation Units:
 op, v1, v2, d1
 op, v1, d1, d2

To the Decision Units:
 pr, v1, v2, t1, d1
 pr, v1, t1, d1, t2, d2
 bo, c1, c2, t1, d1, t2, d2, t3, d3
 bo, c1, t1, d1, t2, d2, t3, d3

Structural details of operation units 24 and decision units 26 are substantially the same as details of the Functional Units shown in FIGS. 6 and 34 and described at column 5, lines 1 through 12 and at column 14, lines 30 through 45 of aforementioned U.S. Pat. No. 3,962,706. The difference between the operation units 24 and the decision units 26 lies in the function of the Operation Unit shown in FIG. 34 of U.S. Pat. No. 3,962,706. In the case of operation units 24, this Operation Unit of U.S. Pat. No. 3,962,706 performs arithmetic and logical operations such as those performed by the Arithmetic Logic Unit (ALU) of a typical digital computer. In the case of decision units 26, the Operation Unit of U.S. Pat. No. 3,962,706 performs test and comparison operations such as those performed by digital magnitude comparators.

An initial configuration of Instruction Cells corresponding to the basic data-flow program of FIG. 8 is given in FIG. 13. For simplicity, Cells containing control distribution and data forwarding instructions are not shown. Instead, we have taken the liberty of writing any number of addresses in the destination fields of instructions.

The initial values of x and y are placed in Registers 2 and 5. Cells 1 and 2, containing these values, are then enabled and present to the Arbitration Network the operation packets

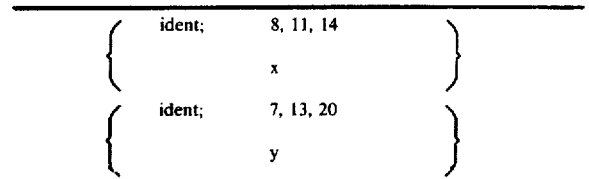

These packets are directed to an identity Operation Unit which merely creates the desired data packets with the values of x and y and delivers the packets to the Distribution Network.

Upon receipt by the Memory of the data packets directed to Registers 7 and 8, cell 3 will be enabled and will transmit its decision packet to a Decision Unit to perform the less than function. The result of the decision will be returned through the Control Network as five control packets. If the result is true, Cells 4, 5 and 6 will be enabled and will send their contents through the Arbitration Network to Operation Units capable of performing the identity and addition operations. If the result of the decision is false, output cells 7 and 8 will be enabled, and cells 4, 5, and 6 will have their gated operands deleted.

Two-Level Memory Hierarchy

The high level of parallel activity achievable in data-flow processors makes a unique form of memory hierarchy feasible: the Instruction Cells are arranged to act as a cache for the most active instructions of the data-flow program. Individual instructions are retrieved from auxiliary memory (the Instruction Memory) as they become required by the progress of computation, and instructions are returned to the Instruction Memory when the Instruction Cells holding them are required for more active parts of the program.

The organization of a basic data-flow processor with Instruction Memory is given in FIG. 1.

Instruction Memory

The Instruction Memory has a storage location for each possible register address of the basic processor. These storage locations are organized into groups of three locations identified by the address of the first location of the group. Each group can hold the contents of one Instruction Cell in the formats already given in FIG. 10.

A memory command packet {a, retr} presented to the command port of the Instruction Memory, requests retrieval of an instruction packet {a, x} in which x is the Cell contents stored in the group of locations specified by address a. The instruction packet is delivered at the retrieve port of the Instruction Memory.

An instruction packet {a, x} presented at the store port of the Instruction Memory requests storage of Cell contents x in the three-location group specified by address a. However, the storage is not effective until a memory command packet {a, store} is received by the Instruction Memory at its command port, and any prior retrieval request has been honored. Similarly, retrieval requests are not honored until prior storage requests for the group have taken effect.

Cell Block Operation

For application of the cache principle to the basic data-flow processor, an Instruction Memory address is divided into a major address and a minor address, each containing a number of bits of the address. One Cell Block of the processor is associated with each possible major address. All instructions having the same major address are processed by the Instruction Cells of the corresponding Cell Block. Thus the Distribution Network uses the major address to direct data packets, control packets, and instruction packets to the appropriate Cell Block. The packets delivered to the Cell Block include the minor address, which is sufficient to determine how the packet should be treated by the Cell Block.

Operation and decision packets leaving a Cell Block have exactly the same format as before. Instruction packets leaving a Cell Block have the form {m, x} where m is a minor address and x is the contents of an Instruction Cell. The major address of the Cell Block is appended to the packet as its travels through the Arbitration Network. In the same way, memory command packets leave the Cell Block with just a minor address, which is augmented by the major address of the Cell Block during its trip through the Memory Command Network.

Figure 14:
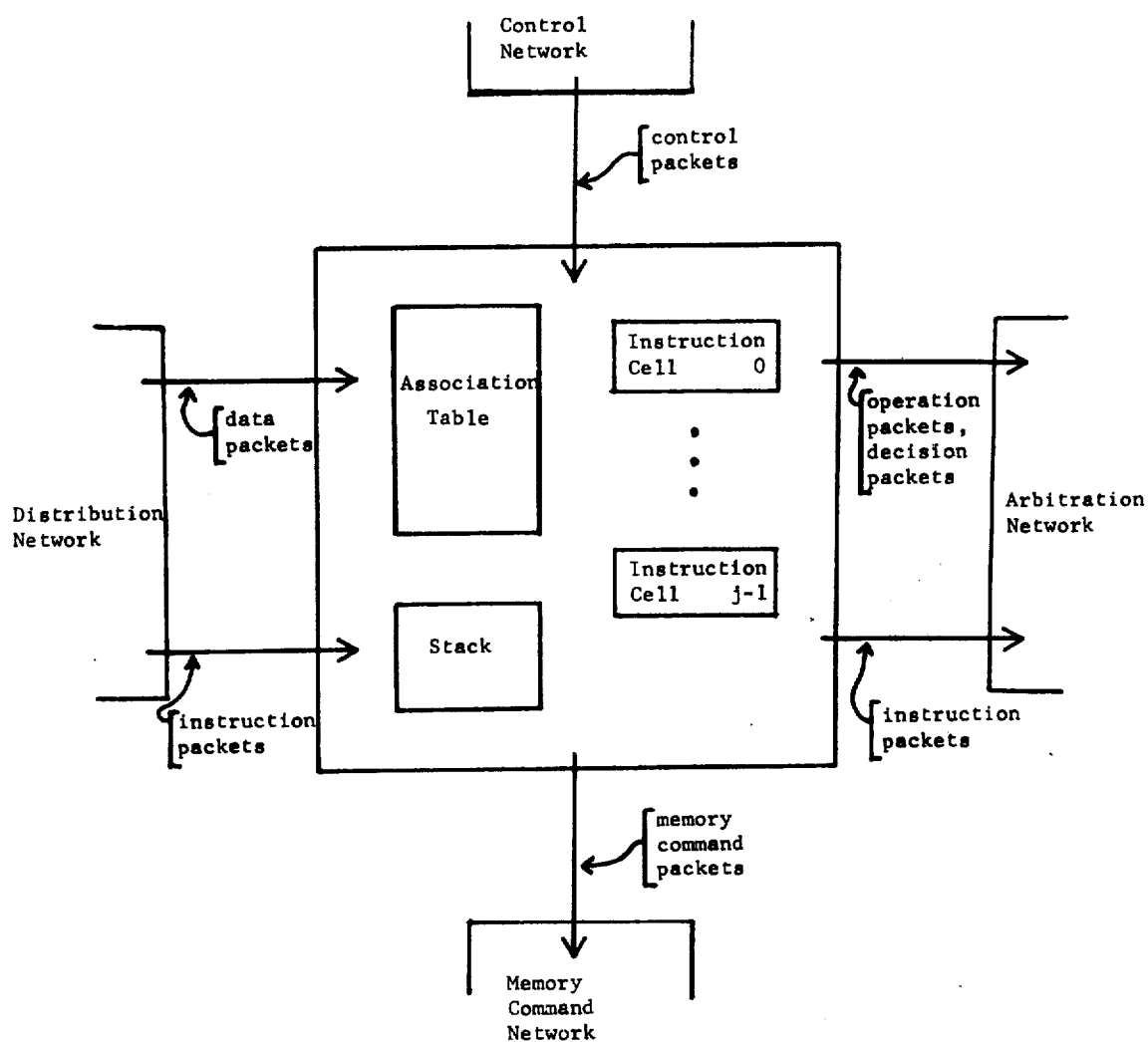
FIG. 14 is a detail schematic of a component of FIG. 1, incorporating a plurality of instruction cells of the type shown in FIG. 3, together with associated components.

FIG. 14 shows the structure of a Cell Block. Each Instruction Cell is able to hold any instruction whose major address is that of the Cell Block. Since many more instructions share a major address than there are Cells in a Cell Block, the Cell Block includes an Association Table which has an entry {m, i} for each Instruction Cell; m is the minor address of the instruction to which the Cell is assigned, and i is a Cell status indicator whose values have significance as follows:

| status value | meaning |
| --- | --- |
| free | the Cell is not assigned to any instruction |
| engaged | the Cell has been engaged for the instruction having minor address m, by arrival of a data or control packet |
| occupied | the Cell is occupied by an instruction with minor address m |

The Stack element of a Cell Block holds an ordering of the Instruction Cells as candidates for displacement of their contents by newly activated instructions. Only Cells in occupied status are candidates for displacement.

Operation of a Cell Block can be specified by giving two procedures—one initiated by arrival of a data or control packet at the Cell Block, and the other activated by arrival of an instruction packet from the Instruction Memory.

Figure 12B:
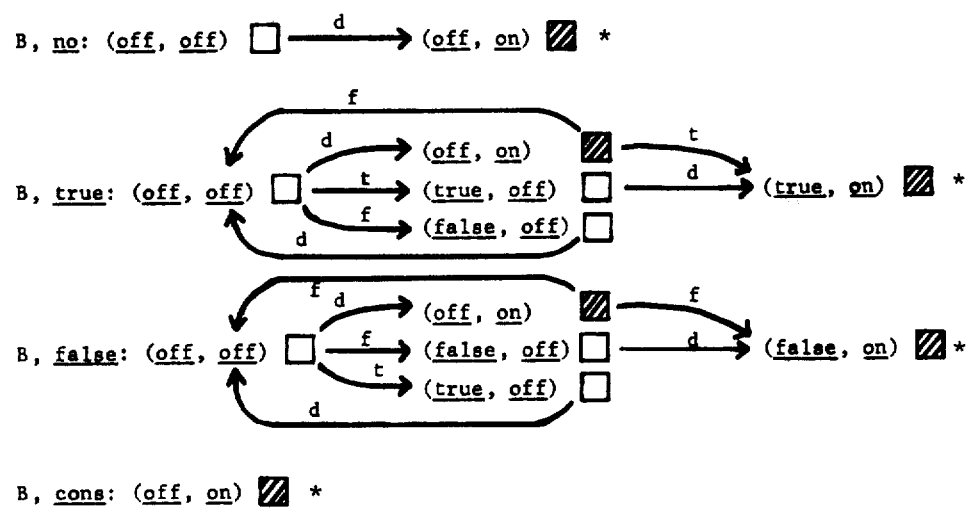

Procedure 1: Arrival of a data or control packet {n, y} where n is a minor address and y is the packet content.

step 1. Does the Association Table have an entry with minor address n? If so, let p be the Cell corresponding to the entry, and go to step 5. Otherwise continue with step 2.

step 2. If the Association Table shows that no Instruction Cell has status free, go to step 3. Otherwise let p be a Cell with status free. Let the Association Table entry for p be {m, free}; go to step 4.

step 3. Use the Stack to choose a Cell p in occupied status for preemption; let the Association List entry for p be {m, occupied}; transmit the contents z of Cell p as an instruction packet {m, z} to the Instruction Memory via the Arbitration Network; transmit the memory command packet {m, store} to the Instruction Memory through the Memory Command Network.

step 4. Make an entry {n, engaged} for Cell p in the Association Table; transmit the memory command packet {n, retr} to the Instruction Memory via the Memory Command Network.

step 5. Update the operand register of Cell p having minor address n according to the content y of the data or control packet (the rules for updating are those given in FIG. 12). If Cell p is occupied the state change of the register must be consistent with the instruction code or the program is invalid. If Cell p is engaged, the change must be consistent with the register status left by preceding packet arrivals.

step 6. If Cell p is occupied and all three registers are enabled (according to the rules of FIG. 12), the Cell p is enabled: transmit an operation or decision packet to the Operation Units or Decision Units through the Arbitration Network; leave Cell p in occupied status holding the same instruction with its operand register reset (receivers empty with the gate and value flags set to off). Change the order of Cells in the Stack to make Cell p the last candidate for displacement.

Procedure 2: Arrival of an instruction packet {n, x} with minor address n and content x.

step 1. Let p be the Instruction Cell with entry {n, engaged} in the Association Table.

step 2. The status of the operand registers of Cell p must be consistent with the content x of the instruction packet, or the program is invalid. Update the contents of Cell p to incorporate the instruction and operand status information in the instruction packet.

step 3. Change the Association Table entry for Cell p from {n, engaged} to {n, occupied}.

step 4. If all registers of Cell p are enabled, then Cell p is enabled: transmit an operation or decision packet to the Operation Units or Decision Units through the Arbitration Network; leave Cell p in occupied status holding the same instruction with its operand registers reset. Change the order of Cells in the Stack to make Cell p the last candidate for displacement.

Since certain changes may be made in the foregoing specification and the accompanying drawings without departing from the scope of the present invention, it is intended that all matter of the present disclosure be interpreted in an illustrative and not in a limiting sense.

What is claimed is:

1. A digital data processor comprising:
   (a) active memory means for holding at least a record of active instructions, said active memory means containing a plurality of cells, each cell holding one instruction of said record of active instructions and each cell having a unique cell index addressable by a destination address;
   (b) instruction memory means for holding at least a record of a program, said instruction memory means holding all instructions comprising said record of a program and each instruction having a unique instruction index;
   (c) operation means for managing signals in the execution of arithmetic and logical operations on signals representing data values including at least a destination address and a computed value.
   (d) decision means for managing signals in the execution of comparison and testing operations on signals representing Boolean and control values;
   (e) first arbitration means operatively connected between said active memory means and said operation means and operatively connected between said active memory means and said decision means for concurrently transmitting signals representing a plurality of first information packets from said active memory means to said operation means and for concurrently transmitting signals representing a plurality of second information packets from said active memory means to said decision means, each of said signals representing first information packets and each of said signals representing second information packets consisting of signals representing an instruction of said record of active instructions together with all critical data values required for its execution;

(f) control means operatively connected between said decision means and said active memory means for concurrently transmitting signals representing a plurality of third information packets from said decision means to said active memory means, each of said signals representing third information packets consisting of signals representing Boolean and control values computed by said decision means and required for the execution of said record of active instructions contained in said cells of said active memory means;

(g) first distribution means operatively connected between said operation means and said active memory means for concurrently transmitting signals representing a plurality of fourth information packets from said operation means to said active memory means, each of said signals representing fourth information packets consisting of signals representing data values computed by said operation means and required for execution of each of said active instructions contained in said active memory means at its corresponding destination address;

(h) memory command means operatively connected between said active memory means and said instruction memory means for concurrently transmitting signals representing a plurality of fifth information packets from said active memory means to said instruction memory means, each of said signals representing fifth information packets consisting of signals specifying storage, retrieval, and administrative operations to be performed by said instruction memory means;

(i) second arbitration means operatively connected between said active memory means and said instruction memory means for concurrently transmitting signals representing a plurality of sixth information packets from said active memory means to said instruction memory means said sixth packet representing instructions whose operations have been performed, each of said signals representing sixth information packets consisting of signals representing instructions of said record of a program to be temporarily stored in said instruction memory means; and (j) second distribution means operatively connected between said instruction memory means and said active memory means for concurrently transmitting signals representing a plurality of seventh information packets from said instruction memory means to said active memory means, each of said signals representing seventh information packets consisting of signals representing instructions of said record of a program being conveyed to said active memory means to become instructions of said record of active instructions.

2. The digital data processor of claim 1 wherein said active memory means includes a plurality of cells, each of said cells having register means, said register means consisting of means for holding information records.

3. The digital data processor of claim 2 wherein said information records include a set of instructions and data items, each of said instructions including a set of functional specifications and destination indices, each of said functional specifications designating a path through said first arbitration means to one of said operation means or said decision means and each of said destination indices specifying a path through said control means or said first distribution means to one of said cells in said active memory means.

4. The digital data processor of claim 3 wherein each of said functional specifications includes a set of operational specifications and decision specifications, each of said operational specifications designating a path through said first arbitration means to one of said operation means and each of said decision specifications designating a path through said first arbitration means to one of said decision means.

5. The digital data processor of claim 1 wherein said operation means consists of computation means for the execution of aritmetic and logical operations on operand values received from said first arbitration means and first result means for transmitting data values realized by said computation means in conjunction with destination indices to said first distribution means.

6. The digital data processor of claim 5 wherein said signals representing first information packets are received by said operation means from said first arbitration means, and first information packets containing destination indices and all relevant operands, and said signals representing fourth information packets directed from said operation means to said first distribution means include a plurality of destination indices and result values.

7. The digital data processor of claim 1 wherein said decision means consists of testing means for the execution of comparison and testing operations on Boolean and control values contained in said second information packets received from said first arbitration means and second result means for transmitting values realized by said testing means in conjunction with destination indices to said control means.

8. The digital data processor of claim 7 wherein said signals representing second information packets are received by said decision means from said first arbitration means, said information packets containing destination indices and all revelant operands, and said signals representing third information packets directed from said decision means to said control means including a plurality of destination indices and result values.

9. The digital data processor of claim 1 wherein said first arbitration means concurrently transmits a plurality of signals representing first information packets from said active memory means to said operation means and a plurality of signals representing second information packets from said active memory means to said decision means, each of said first and second information packets containing a functional specification, a destination index, and all relevant operands, said functional specification designating a path through said arbitration means to said operation and decision means, said functional specification designating either an operation to be performed by said operation means on said relevant operands contained in said first information packet or by said decision means on said relevant operands contained in said second information packet, and said destination index designating a path through said first distribution means or said control means for a result value realized by the performance of the operation specified by said functional specification.

10. The digital data processor of claim 1 wherein said active memory means contains a plurality of cell blocks, each of said cell blocks being characterized by a plurality of cells, said cells constituting means for holding instructions and their relevant operands, said instructions being characterized by functional specifications and destination indices, said cell blocks constituting a cache for active instructions.

11. The digital data processor of claim 1 wherein a plurality of said signals representing third information packets are concurrently transmitted by said control means from said decision means and each of said packets contains a destination index and a control value, said destination index specifying a path through said control means to a destination cell in said active memory means and said control value representing a result computed by said decision means.

12. The digital data processor of claim 1 wherein a plurality of said signals representing fourth information packets are concurrently transmitted by said first distribution means from said operation means and each of said packets contains a destination index and a result value, said destination index specifying a path through said first distribution means to a destination cell in said active memory means and said result value representing a result computed by said operation means.

13. The digital data processor of claim 1 wherein said record of a program has instructions, each instruction being held in a location of said instruction memory having a unique address identifier, said instructions including functional specifications, destination indices and operand control pairs.

14. The digital data processor of claim 1 wherein a plurality of signals representing sixth information packets are concurrently transmitted by said second arbitration means and each contains a unique address identifier and an instruction containing a functional specification, destination indices and operand control pairs, wherein said unique address identifier designates the location of said instruction in said instruction memory means, specifying a path through said second arbitration means to said location in said instruction memory means.

15. The digital data processor of claim 1 wherein a plurality of said signals representing seventh information packets are concurrently transmitted by said second distribution means and each contains a unique address identifier and an instruction containing a functional specification, destination indices and operand control pairs, said unique address identifier designates the location of said instruction in said instruction memory means and specifies a path through said second distribution means to a destination cell in said active memory means, where said instruction contained in the seventh information packet upon receipt by said cell becomes a member of said record of active instructions.

16. The digital data processor of claim 1 wherein a plurality of said signals representing fifth information packets are concurrently transmitted by said memory command means and each contains a unique address identifier and a command for said instruction memory means, said unique address identifier designating the location in said instruction memory means affected by said command and said unique address identifier specifying a path through said memory command means to said location in said instruction memory means.

17. A digital data processor comprising:
(a) active memory means for holding at least a record of active instructions, said active memory means containing a plurality of cells, each cell holding one instruction of said record of active instructions and each cell having a unique cell index addressable by a destination address;
(b) operation means for managing signals in the execution of arithmetic and logical operations on signals representing data values including at least a destination address and a computer value;
(c) decision means for managing signals in the execution of comparison and testing operations on signals representing Boolean and control values;
(d) arbitration means operatively connected between said active memory means and said operation means and operatively connected between said active memory means and said decision means for concurrently transmitting signals representing a plurality of first information packets from said active memory means to said operation means and for concurrently transmitting signals representing a plurality of second information packets from said active memory means to said decision means, each of said signals representing first information packets and each of said signals representing second information packets consisting of signals representing an instruction of said record of active instructions together with all critical data values required for its execution;
(e) control means operatively connected between said decision means and said active memory means for concurrently transmitting signals representing a plurality of third information packets from said decision means to said active memory means, each of said signals representing third information packets consisting of signals representing Boolean and control values computed by said decision means and required for the execution of said record of active instructions contained in said cells of said active memory means; and
(f) distribution means operatively connected between said operation means and said active memory means for concurrently transmitting signals representing a plurality of fourth information packets from said operation means to said active memory means, each of said signals representing fourth information packets consisting of signals representing data values computed by said operation means and required for execution of each of said active instructions in said active memory means at its corresponding destination address.

* * * * *